(12) United States Patent
Fu et al.

(10) Patent No.: US 9,591,502 B2
(45) Date of Patent: Mar. 7, 2017

(54) METHOD AND EQUIPMENT FOR FEEDING BACK MINIMIZATION DRIVE TEST LOG

(71) Applicant: CHINA ACADEMY OF TELECOMMUNICATIONS TECHNOLOGY, Beijing (CN)

(72) Inventors: Jing Fu, Beijing (CN); Xiaodong Yang, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 9 days.

(21) Appl. No.: 13/691,751

(22) Filed: Dec. 1, 2012

(65) Prior Publication Data
US 2013/0184026 A1 Jul. 18, 2013

Related U.S. Application Data

(63) Continuation of application No. PCT/CN2011/075020, filed on May 31, 2011.

(30) Foreign Application Priority Data

Jun. 22, 2010 (CN) .......................... 2010 1 0215859

(51) Int. Cl.
  *H04W 24/10* (2009.01)
  *H04W 16/18* (2009.01)
(52) U.S. Cl.
  CPC ............ *H04W 24/10* (2013.01); *H04W 16/18* (2013.01)
(58) Field of Classification Search
  USPC ........................................................ 455/422
  See application file for complete search history.

(56) References Cited

U.S. PATENT DOCUMENTS

| 8,594,657 B2* | 11/2013 | Wu ........................ H04W 24/10 370/331 |
| 2011/0183661 A1* | 7/2011 | Yi ........................... H04W 24/10 455/422.1 |
| 2012/0100884 A1* | 4/2012 | Radulescu et al. ........... 455/524 |

FOREIGN PATENT DOCUMENTS

CN 101137208 3/2008

OTHER PUBLICATIONS

Deutsche Telekom et al: "MDT measurement area configuration", 3GPP Draft; R2-102750, 3rd Generation Partnership Project (3GPP), Mobile Competence Centre; 650; Route Des Lucioles F-06921 Sophia-Antipolis Cedex; France, vol. RAN WG2 , No. Montreal , Canada; 20100510; May 3, 2010 (May 3, 2010),XP050423027, pp. 1-2.

(Continued)

*Primary Examiner* — Asghar Bilgrami
(74) *Attorney, Agent, or Firm* — Ladas & Parry, LLP

(57) ABSTRACT

The present invention discloses a method and equipments for feeding back MDT Log. Terminal equipment rationally chooses whether to send Log available message to the network based on the fact whether present attribution zone(s) of terminal equipment is the valid attribution zone(s), or report the information of present attribution zone(s) to network side, then the network side judges whether to acquire MDT Log, so as to avoid feeding back MDT Log and further causing loss of valid MDT Log in case of no correspondence of present attribution zone(s). Moreover, terminal equipment can decide whether to report Log available message to the network side according to the condition of actual attribution zone(s), which avoids unnecessary reporting of MDT Log and validly saves radio resource of the system.

17 Claims, 11 Drawing Sheets

(56) References Cited

OTHER PUBLICATIONS

Catt: "Handling of the Log Available Indication", 3GPP Draft; R2-102793, 3rd Generation Partnership Project (3GPP, Mobile Competence Centre 650, Route Des Lucioles F-06921 Sophia-Antipolis Cedex; France, vol. RAN WG2, No. Montreal , Canada; 20100510, May 4, 2010 (May 4, 2010), XP050423135; pp. 1-2.
3rd Generation Partnership Project; Technical Specification Group TSG RANUniversal Terrestrial Radio Access (UTRA) and Evolved Universal Terrestrial Radio Access (E-UTRA);Radio measurement collection for Minimization of Drive Tests (MDT);Overall description; Stage 2(Release 10), 3GPP Draft; 37320-041 , 3rd Generation Partnership Project (3GPP) , Mobile Competence Centre 650, Route Des Lucioles F-06921 Sophia-Antipolis Cedex;France , vol. RAN WG2 , No. Montreal , Canada; 20100510 , May 15, 2010 (May 15, 2010) , XP050423422.
Extended European Search Report with EPO Supplementary European Search Report for EP11797571.4 dated Jul. 1, 2016.
Office Action for related Chinese Application No. 2010102158596 dated Jun. 27, 2013 and its English translation.
Office Action for related Korean Application No. 10-2012-7024437 dated Oct. 14, 2013 and its English translation.
Decision of Rejection for related Korean Application No. 10-2012-7024437 dated Aug. 14, 2014 and its English translation.
ISR/WO for related PCT/CN2011/075020 mailed on Sep. 15, 2011.
NNT Docomo, "MDT support for roaming and network sharing scenarios", 3GPP TSG-RAN WG2 Meeting#70, R2-102997, 2010. 5. 10.
Catt, "Handling of the Log Available Indication", 3GPP TSG-RAN WG2 Meeting #70, R2-102793, 2010. 5. 10.

\* cited by examiner

METHOD AND EQUIPMENT FOR FEEDING BACK MINIMIZATION DRIVE TEST LOG

CROSS REFERENCE TO RELATED APPLICATIONS

This application is a continuation of PCT/CN2011/075020 filed on May 31, 2011, which claims priority to Chinese Patent Application No. 201010215859.6 filed in the Patent Office of the People's Republic of China on Jun. 22, 2010, entitled "Method and Equipment for Feeding Back Minimization Drive Test Log" the disclosures of which are hereby incorporated by reference in their entireties.

FIELD OF THE INVENTION

The present invention relates to the field of communication technology, in particular to a method and equipment for feeding back MDT Log.

BACKGROUND OF THE INVENTION

In present technology solution, MDT (Minimization Drive Test) is divided into Immediate MDT and Logged MDT based on reporting mode:

Immediate MDT, the terminal equipment performs MDT measurements and report in connection state; the terminal equipment will immediately report the measurement results to eNB (evolved Node B)/RNC (Radio Network Controller) in form of multiplexing RRM (Radio Resource Management) once the conditions are met.

Logged MDT, terminal equipment collects measurement results in idle state, which will be reported in subsequent connection state. Terminal equipment will log the measurements results and report those to eNB/RNC at proper opportunity subsequently.

Log configuration of MDT is sent to terminal equipment with a new configuration message, which is not based on current RRM measurement mechanism.

Terminal equipment side: terminal equipment will not release Log configuration received when releasing RRC (Radio Resource Control) connection, but will keep configuration and launch Log task and measurement results collection in idle state.

Network side: network will not keep MDT context information for Logged MDT, nor transfer MDT context among network unit. When RRC connection is released, MDT context saved at network side will also be released at the same time.

In Logged MDT mode, when terminal equipment saves valid MDT Log and enters connection state from idle state, it will report Log available to network via. RRC signalling to inform the network side that the terminal equipment saves available MDT Log.

LTE (Long Term Evolution) system is taken as an example to explain. RRC connection setup procedure is shown in FIG. 1. After the successful setup of RRC connection, terminal equipment sends to network the RRCConnectionSetupComplete message that carries the indication information on whether terminal equipment saves available MDT Log (viz. said Log available). After receiving the indication, network can request subsequently terminal equipment to report the MDT Log saved.

Similarly, during cell handover and reestablishment procedures of LTE system, terminal equipment will send Log available information to eNB of target cell switched/reestablished cell to inform the new cell whether available MDT Log is saved in terminal equipment.

In UMTS (Universal Mobile Telecommunications System), if SRNS (Serving Radio Network Subsystem) relocation process occurs, terminal equipment will also send Log available message to target cell.

Terminal equipment may be reconfigured with Logged MDT task when moving to a new cell; then it will delete the Logged MDT configuration saved previously and MDT results having not been reported yet; while terminal equipment will save the original configuration and Log results if it does not receive new Logged MDT configuration when moving to a new cell.

As shown in FIG. 2, several OMC will be provided in a network at present to maintain different eNBs respectively. Typically, if an operator adopts equipment of different manufacturers for networking in a province of China, every manufacturer will have its own OMC (Operations & Maintenance Center) to maintain its equipment. If no interface is set up between OMCs of different manufacturers, it will be impossible for MDT data to be transferred among OMCs.

Similarly, as shown in FIG. 3, a network may have several PLMNs (Public Land Mobile-communication Network). The network may be shared, such as operator 1 shares the same network with operator 2, operator 1 maintains PLMN1 and operator 2 maintains PLMN2. When both the two operators do not sign a contract regarding mutual transmission of MDT data, it will also be impossible for MDT results to be transmitted between different PLMNs.

In the course of implementing the present invention, the inventor finds out there are at least the problems below in the present technology:

When Log information is available for MDT in terminal equipment, it can be informed to network side through RRC message during setup/handover/reestablishment/cell update procedures and trigger network side to acquire Log information in terminal equipment. With the handover procedure, reestablishment procedure, or cell update procedure, the updated cell and the original cell may belong to different OMCs or PLMNs. If terminal equipment sends the same Log available indication to target network side, the target network may request terminal equipment to report MDT Log. However, if network side does not support the reporting across OMC or PLMN, radio resource will be wasted. Furthermore, terminal equipment will delete corresponding MDT Log after reporting it, which will cause the loss of MDT Log.

SUMMARY OF THE INVENTION

The embodiments of the present invention provide a method and equipment for feeding back MDT Log, which realizes the rational reporting of Log available indication to network by terminal equipment according to valid attribution zone(s) of MDT Log, or zone(s) prevents the loss of valid MDT Log by reporting present attribution zone(s) of MDT Log.

To achieve the aforesaid purpose, embodiments of the present invention provide a method for feeding back MDT Log on one hand, including:

When terminal equipment connects to a target cell by switching from idle state to connection state, or reestablishes to a target cell, or handovers to a target cell owing to mobility in connection state, said terminal unit verifies whether it is permitted to feed back MDT Log across any attribution zone(s);

If said terminal equipment verifies that feeding back MDT Log across any attribution zone(s) is not permitted, said terminal equipment will further judge whether attribution zone(s) of the target cell belongs to the predefined valid attribution zone(s);

If "Yes", said terminal equipment will send Log available information to the target cell.

Besides, the embodiments of the present invention also provide a terminal equipment, including:

Storage module, which is used to save MDT Log;

Verification module, which is used to verify whether feeding back MDT Log across any attribution zone(s) is permitted when said terminal equipment connects to a target cell by switching from idle state to connection state, or reestablishes to a target cell, or handovers to a target cell owing to mobility in connection state;

Judgment module, which is used to judge whether the attribution zone(s) of the said target cell belongs to the predefined valid attribution zone(s) when said verification module verifies that feeding back MDT Log across any attribution zone(s) is not permitted;

Sending module, which is used to send Log available information to the said target cell when the judgment result of said judgment module is "Yes".

Besides, the embodiments of the present invention also provide an eNB, including:

Configuration module, which is used to send to terminal equipment the information on whether feeding back MDT Log across any attribution zone(s) is permitted;

Communication module, which is used to receive Log available information sent by said terminal equipment, and send MDT Log reporting request after receiving Log available information.

Besides, the embodiments of the present invention also provide a method for feeding back MDT Log, including:

eNB receives the message containing the information of present attribution zone(s) of said terminal equipment sent by terminal equipment;

Said eNB judges whether present attribution zone(s) of said terminal equipment is the predefined valid attribution zone(s);

If "Yes", said eNB will send Log reporting request to said terminal equipment and receive MDT Log reported by said terminal equipment.

Besides, the embodiments of the present invention also provide an eNB, including:

Setting module, which is used to set valid attribution zone(s);

Reception module, which is used to receive the message containing the information of present attribution zone(s) of said terminal equipment sent by terminal equipment and MDT Log reported by said terminal equipment;

Judgment module, which is used to judge whether present attribution zone(s) of said terminal equipment belongs to the predefined valid attribution zone(s) set by said setting module when said reception module receives the message containing the information of present attribution zone(s) of said terminal equipment sent by said terminal equipment;

Sending module, which is used to send Log reporting request message to said terminal equipment when the judgment result of said judgment module is "Yes", so as to trigger said terminal equipment to report MDT Log.

Besides, the embodiments of the present invention also provide a terminal equipment, including: Storage module, which is used to save MDT Log;

Sending module, which is used to send the message containing the information of present attribution zone(s) of said terminal equipment to eNB;

Reception module, which is used to receive Log reporting request message sent by said eNB and trigger said sending module to report all valid MDT Log saved by said storage module to said eNB.

Compared with the present technology, the present invention possesses the following advantages:

Upon application of technical solution proposed through embodiment of this invention, terminal equipment rationally chooses whether to send Log available information to network based on the fact whether present attribution zone(s) of terminal equipment is a valid attribution zone(s), or report the information of present attribution zone(s) to network side so as to enable network side to judge whether to acquire MDT Log. These can avoid feeding back MDT Log and further causing loss of valid MDT Log in case present attribution zone(s) is not a valid attribution zone(s). Moreover, terminal equipment can decide whether to report Log available information according to the condition of actual attribution zone(s), which can further avoid unnecessary reporting of MDT Log and efficiently saving radio resource of the system.

BRIEF DESCRIPTION OF THE DRAWINGS

To further explain the technical solution of the embodiments of the present invention or present technology, the drawings required will be briefly introduced below. Obviously, the following described drawings only refer to some embodiments of the present invention. Technical personnel of the field can obtain other drawings according to these drawings without contributing creative work.

DETAILED DESCRIPTION OF PREFERRED EMBODIMENTS

The technical solution of the embodiments of the present invention will be described clearly and completely with the drawings. Apparently, the described embodiments are only a part of the embodiments of the present invention. Other embodiments based on the embodiments of the present invention obtained by technical personnel of the field without contributing creative work shall be protected by the present invention.

As for Logged MDT, MDT Log is reported under the control of network side (the aforesaid eNB of target cell). But before network side notifies terminal equipment to report, terminal equipment will give a Log available notice to network side, viz. said Log available information.

Figure 1:
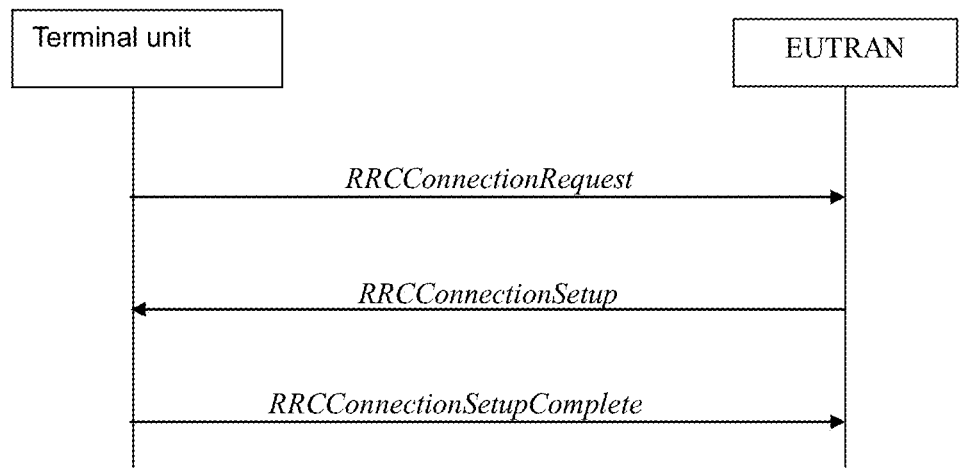
FIG. 1 is a flow diagram of RRC connection setup procedure in present technology.
Figure 2:
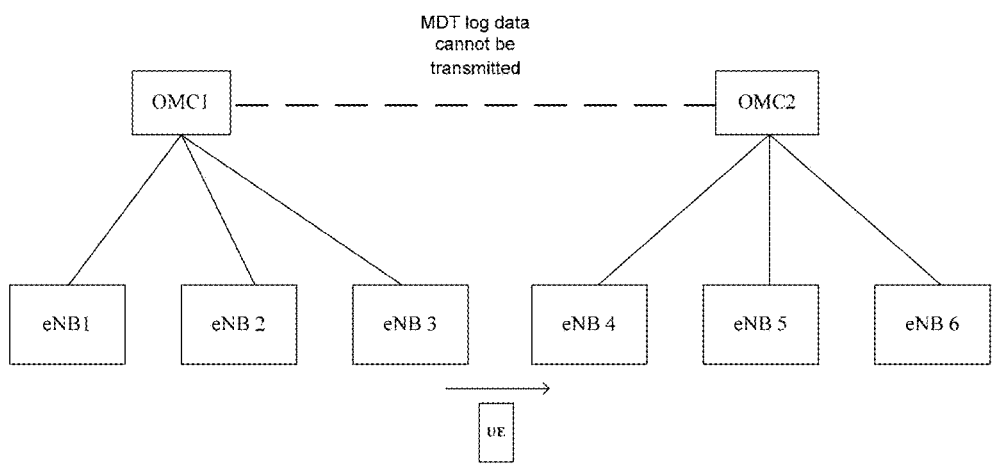
FIG. 2 is a structural diagram that several eNBs are maintained by different OMCs respectively in a network with present technology.
Figure 3:
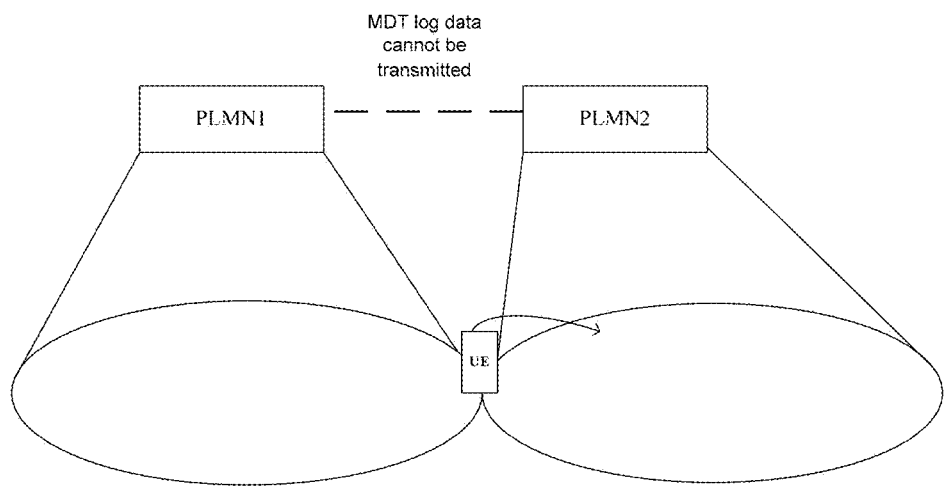
FIG. 3 is a structural diagram that there are several PLMNs in a network in present technology.
Figure 4:
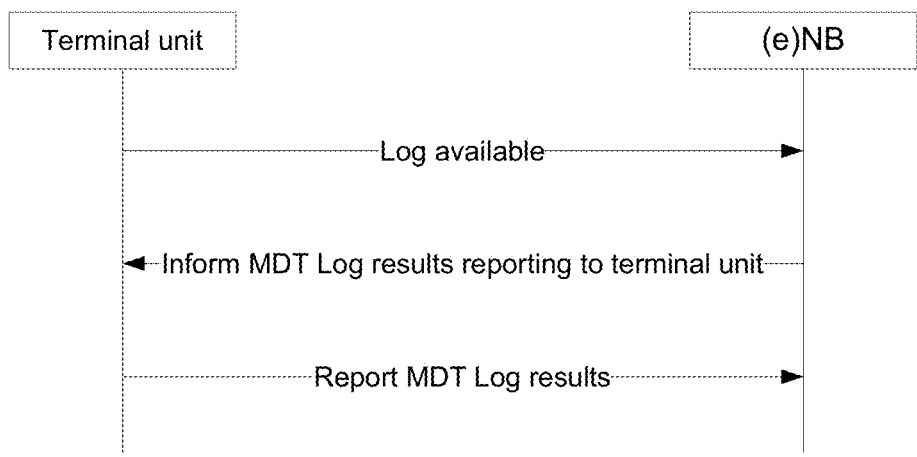
FIG. 4 is a flow diagram of method for feeding back MDT Log under concrete application scenario in the embodiment of the present invention.

The Log available information is generally sent during connection setup/cell handover/cell reestablishment/cell update procedures; the flow diagram of which under general application scenario is shown in FIG. 4, described as below:

Case I, terminal equipment enters connection state from idle state to further connect to target cell.

Case II, terminal equipment reestablish connection and reconnects to target cell due to detecting the abnormality.

Case III, terminal equipment is in connection state, but present attribution zone(s) changes into the target cell owing to cell update or handover aroused by mobility.

In the three cases above-mentioned, terminal equipment informs network side whether MDT Log is available; via Log available information reporting. For example, terminal equipment can indicate whether MDT log is available in uplink RRC signalling under practical application scenario.

Network side can request terminal equipment to report the available MDT Log measurement results after receiving Log available information.

However, when mobility across attribution zone(s) occurs, it is still not clear in present technical solution whether terminal equipment is permitted to report MDT Log collected in old system to new system.

Figure 5:
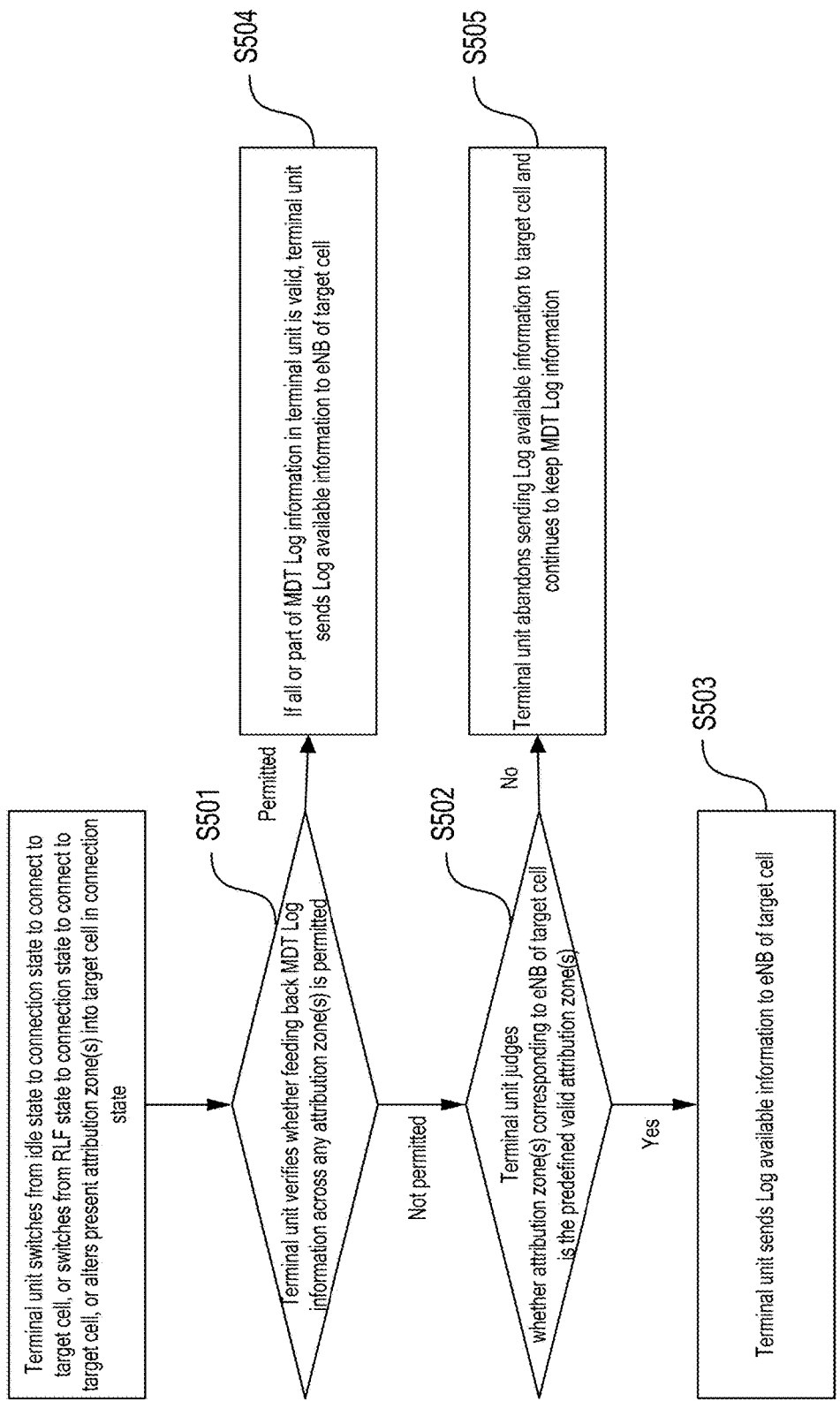
FIG. 5 is a flow diagram of method for feeding back MDT Log in the embodiment of the present invention.

As shown in FIG. 5, the embodiments of the present invention provide a flow diagram of method for feeding back MDT Log, further including the following steps:

Step S501, when terminal equipment connects to target cell by switching from idle state to connection state, or reestablishes to target cell in connection state, or alters current attribution cell to target cell owing to mobility in connection state, terminal equipment verifies whether feeding back MDT Log across any attribution zone(s) is permitted.

When terminal equipment receives the configuration message carrying the information that terminal equipment is permitted to feed back MDT Log to eNBs in one or several defined attribution zones specified, or terminal equipment is set to allow to feed back MDT Log to eNBs in one or several attribution zones, terminal equipment verifies that feeding back MDT Log across any attribution zone(s) is not permitted, but only feeding back MDT Log to eNBs in one or several specified attribution zones is permitted. In such case, implement step S502;

When terminal equipment receives the configuration message carrying the information that terminal equipment is permitted to feed back MDT Log to eNBs in any attribution zone specified, or terminal equipment is set to allow to feed back MDT Log to eNBs in any attribution zone, terminal equipment verifies that feeding back MDT Log across any attribution zone is permitted. In such case, implement step S504;

Step S502, terminal equipment judges whether attribution zone(s) of target cell is the predefined valid attribution zone(s).

The specified one or several attribution zones aforesaid are specifically the predefined valid attribution zones.

In the practical application scenario, the predefined valid attribution zone(s) is specifically one or several kinds of the following information:

PLMN information, cell list information, eNB list information, SA zone(s) list information, tracking area list information, and other information that can express attribution location zone(s) of terminal equipment.

In the practical application scenario, which kind of information shall be used as valid attribution zone(s) can adjust according to the need, and which kind of information would be used will not influence protection scope of this invention.

If "Yes", implement step S503;

If "No", implement step S505.

Step S503, terminal equipment sends Log available information to target cell; the practical process is:

Terminal equipment judges whether MDT Log is saved at present;

If "Yes", terminal equipment will judge whether MDT Log is valid;

If all or part of MDT Log is valid, terminal equipment judges whether attribution zone(s) of target cell is corresponding to one or several attribution zones specified;

If "Yes", terminal equipment sends Log available information to target cell; if "No", terminal equipment abandons sending Log available information to target cell and continues to keep MDT Log.

Step S504, if all or part of MDT Log in terminal equipment is valid, terminal equipment sends Log available information to target cell, the practical implementation process is:

Terminal equipment judges whether MDT Log is saved at present;

If "Yes", terminal equipment will judge whether MDT Log is valid;

If all or part of MDT Log is valid, terminal equipment sends Log available information to target cell.

Furthermore, after step S503 and step S504, viz. after terminal equipment sends Log available information to target cell, the process also includes that terminal equipment reports all saved valid MDT Log at present to target cell after receiving Log reporting request sent by target cell.

Moreover, after the report, terminal equipment deletes the MDT Log reported.

Step S505, terminal equipment abandons sending Log available information to target cell and continues to keep MDT Log.

Compared with the present technology, the present invention possesses the following advantages:

Upon application of technical solution proposed through embodiment of this invention, terminal equipment rationally chooses whether to send Log available information e to the network in light of the fact whether present attribution zone(s) of terminal equipment is the valid attribution zone(s). These can avoid feeding back MDT Log and further causing loss of valid MDT Log in case present attribution zone(s) is not a the valid attribution zone. Moreover, terminal equipment can decide whether to report Log available information according to the condition of actual attribution zone(s), which can avoid unnecessary reporting of MDT Log and validly save radio resource of the system.

Detailed description of the proposed technical solution through embodiment of this invention is given as below with practical application scenario.

To simplify the description, the subsequent description takes the situation that network side does not permit terminal equipment to report across any attribution zone(s) as the example. Situation that reporting across any attribution zone(s) is permitted is given as above. No repeated description shall be provided.

In practical application scenario, terminal equipment selects rationally whether to send Log available information to network according to the fact whether present attribution zone(s) of terminal equipment is a valid attribution zone, specifically as:

It is valid for terminal equipment to report Log data within certain attribution zone(s), viz. the attribution zone(s) is verified as valid attribution zone(s). If terminal equipment moves out from the valid attribution zone(s), Log available message will not be sent. While terminal equipment moves back to the valid attribution zone(s) and if MDT Log of the valid attribution zone(s) is available, Log available information will be sent.

The valid attribution zone(s) can be configured by network side or agreed in advance on terminal equipment; also, identification of this valid attribution zone(s) can be one or several kinds of the following information:

PLMN information, cell list information, eNB list information, SA zone(s) list information, tracking area list information, and other information that can indicate attribution location zone(s) of terminal equipment.

In the practical application scenario, which kind of information shall be specifically used as valid attribution zone(s) can be adjusted according to the need, and which kind of information shall be used will not influence protection scope of this invention.

Specifically, realization flow of said method is explained in the following embodiments of the present invention.

Figure 6:
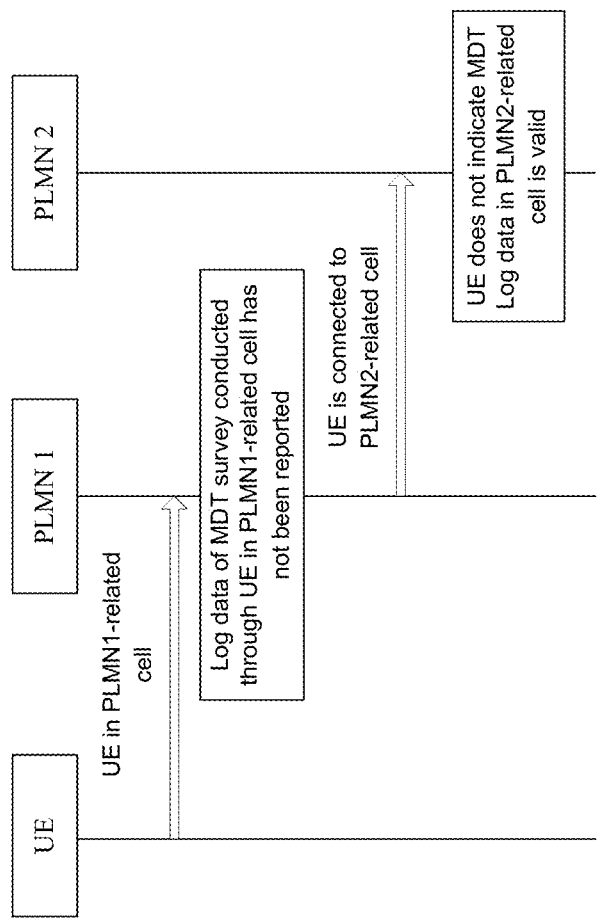
FIG. 6 is a flow diagram of method for feeding back MDT Log under concrete application scenario in the embodiment I of the present invention.

Embodiment I, set it directly that terminal equipment stops sending Log available information in the case of PLMN changes, as shown in FIG. 6.

Since terminal equipment receives MDT configuration when it is attributed to PLMN1, PLMN1 is verified as valid attribution zone, terminal equipment collects Log MDT results and reports them in PLMN1-related cell. Terminal equipment does not finish the transmission of Log data of MDT in PLMN1-related cell. When terminal equipment moves from a PLMN1-related cell to a PLMN2-related cell through RRC connect setup process/handover process/reestablishment process/cell update process. Since PLMN2 is not the valid attribution zone, terminal equipment will not send Log available information to PLMN2-related cell(s).

Figure 7:
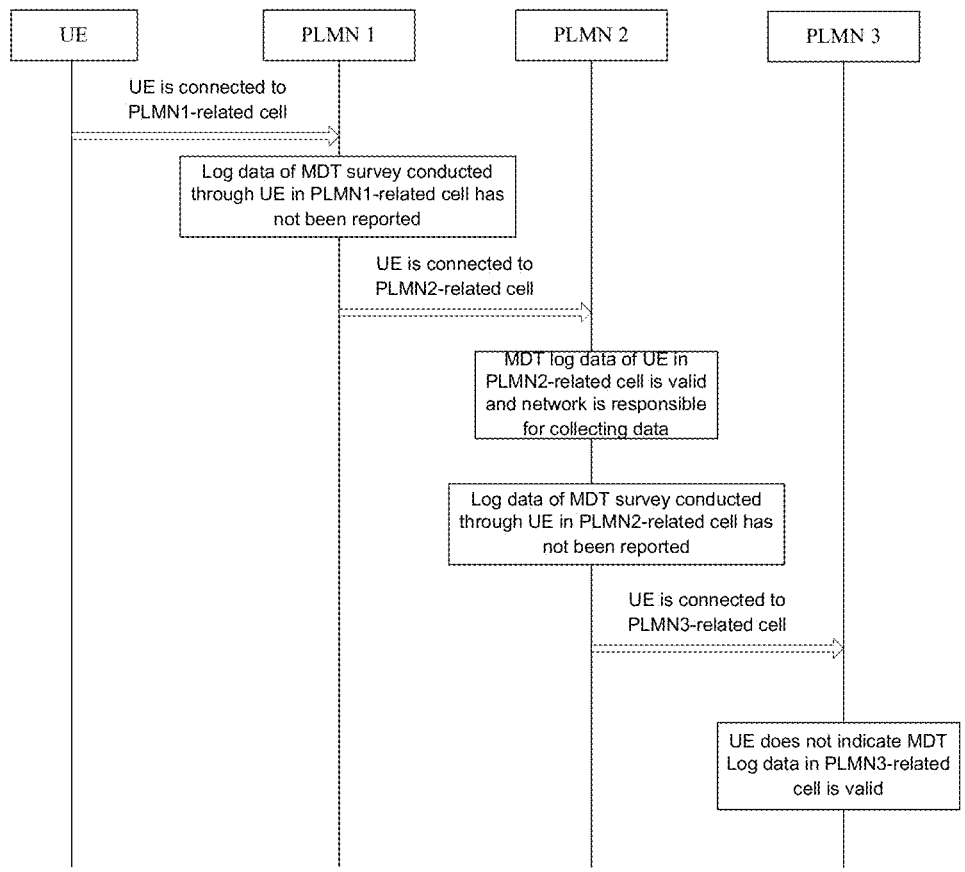
FIG. 7 is a flow diagram of method for feeding back MDT Log under concrete application scenario in the embodiment II of the present invention.

Embodiment II, PLMN zone(s) is specified by network configuration as the valid attribution zone(s), as shown in FIG. 7.

In such embodiments, network configures MDT task for terminal equipment in PLMN1-related cell(s) and meanwhile configures PLMN1 and PLMN2 as the valid report zone(s) of MDT Log, viz. both PLMN1 and PLMN2 are the valid attribution zones.

Since terminal equipment does not finish the transmission of Log data of MDT in PLMN1-related cell(s), considering that PLMN2 is also the valid attribution zone, the terminal equipment continues to send Log available information to the PLMN2-related cell when terminal equipment moves from a PLMN1-related cell to a PLMN2-related cell through setup process/handover process/reestablishment process/cell update process. However, when terminal equipment moves in PLMN3-related cell again, terminal equipment will not send Log available information to PLMN3-related cells because PLMN3 is not a valid attribution zone, although MDT Log data of PLMN1-related cell(s) are available.

Figure 8:
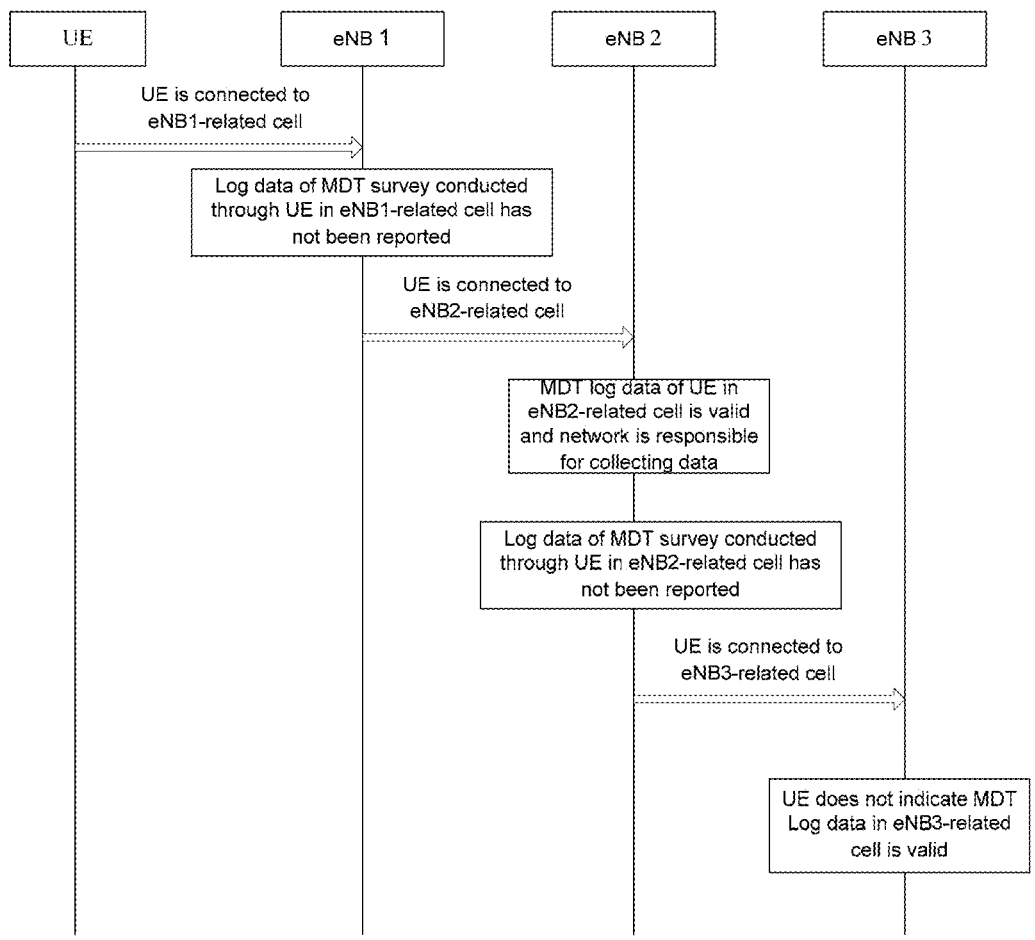
FIG. 8 is a flow diagram of method for feeding back MDT Log under concrete application scenario in the embodiment III of the present invention.

Embodiment III, eNB zone(s) is specified as valid attribution zone(s) by network configuration, as shown in FIG. 8.

In such embodiments, network configures MDT task for terminal equipment in eNB1-related cell(s) and meanwhile configures eNB1 and eNB2 as the valid report zones of MDT Log, viz. both eNB1 and eNB2 are the valid attribution zones (Both eNB1 and eNB2 may belong to the same OMC. In this case, OMC is required to firstly inform eNB which eNBs belong to the same OMC since. Then eNB will configure Log data report valid zone(s) based on the information).

Since terminal equipment does not finish the transmission of Log data of MDT in eNB1-related cell(s), considering that eNB2 is also the valid attribution zone, the terminal equipment continues to send Log available information to eNB2-related cell(s) who is responsible for collecting MDT Log data when terminal equipment moves from a eNB1-related cell to a eNB2-related cell through setup process/handover process/reestablishment process/cell update process. When terminal equipment moves in a eNB3-related cell, terminal equipment will not send Log available information to the eNB3-related cell because eNB3 is not the valid attribution zone(s) although MDT Log data of eNB1-related cell(s) are available.

Compared with the present technology, the present invention possesses the following advantages:

Upon application of technical solution proposed through embodiment of this invention, terminal equipment rationally choose whether to send Log available information to the network in light of the fact whether present attribution zone(s) of terminal equipment is the valid attribution zone(s). These can avoid feeding back MDT Log and further causing loss of valid MDT Log in case present attribution zone is not a the valid attribution zone. Moreover, terminal equipment can decide whether to report Log available information according to the condition of actual attribution zone(s), which avoids unnecessary reporting of MDT Log and validly saving radio resource of the system.

Figure 9:
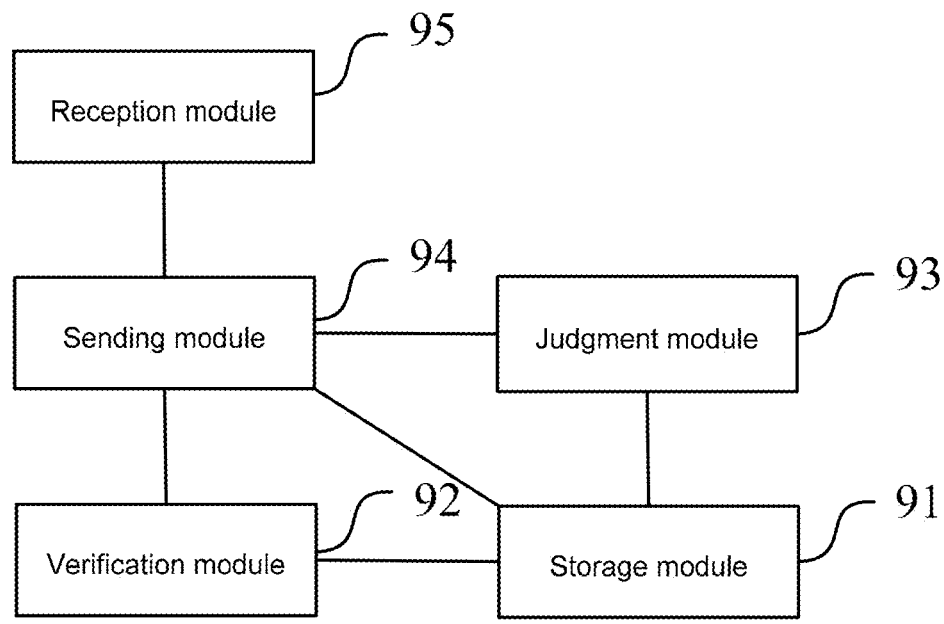
FIG. 9 is a structural diagram of terminal equipment in the embodiment of the present invention.

To realize the technical solution provided in embodiments of the present invention aforesaid, the embodiments of the present invention also provide a terminal equipment, and the structural diagram is shown in FIG. 9, including:

Storage module 91, which is used to save MDT Log;

Verification module 92, which is used to verify whether feeding back MDT Log across any attribution zone is permitted when terminal equipment connects to target cell by switching from idle state to connection state, or reestablishes to target cell, or alters current attribution cell to target cell owing to mobility in connection state;

Judgment module 93, which is used to judge whether attribution zone of target cell is the default valid attribution zone in case that verification module 92 verifies that feeding back MDT Log across any attribution zone is not permitted;

Sending module 94, which is used to send Log available information to target cell when the judgment result of judgment module 92 is "Yes".

In the practical application scenario, verification module 92 verifies through the following ways whether feeding back MDT Log across any attribution zone is permitted, further including:

When verification module 92 receives configuration message carrying the information that terminal equipment is permitted to feed back MDT Log to to any attribution zone, or terminal equipment is set as permitting to feed back MDT Log to any attribution zone, verification module 92 verifies that feeding back MDT Log across any attribution zone is permitted;

When verification module 92 verifies that configuration message carrying the information that terminal equipment is permitted to feed back MDT Log to one or several attribution zone(s)s, or terminal equipment is set as permitting to feed back MDT Log to one or several attribution zones, verification module 92 verifies that feeding back MDT Log across any attribution zone is not permitted, but only feeding back the information to one or several attribution zones specified is permitted;

Wherein, the specified one or several attribution zones are the predefined valid attribution zone(s).

Specifically, the predefined valid attribution zone(s) is specifically one or several kinds of the following information:

PLMN information, cell list information, eNB list information, SA zone(s) list information, tracking area list information, and other information that can express attribution location zone(s) of terminal equipment.

Preferably, when verification module 92 verifies that feeding back MDT Log to any attribution zone is permitted, judgment module 93 judges whether current storage module 91 saves valid MDT Log. If "Yes", sending module 94 sends Log available message to target cell;

When verification module 92 verifies that feeding back MDT Log to one or several attribution zones is permitted, judgment module 93 judges whether current storage module 91 saves valid MDT Log. If "Yes", judgment module 93 judges whether attribution zone of target cell is in one or several defined attribution zones. If "Yes", sending module 94 sends Log available message to target cell; if "No", sending module 94 abandons sending Log available information to target cell and storage module 91 continues to keep MDT Log.

Furthermore, said terminal equipment comprises reception module 95 which is used to receive MDT Log reporting request sent by target cell after sending module 94 sends Log available message to target cell;

Sending module 94, terminal equipment reports all valid MDT Log saved currently to target cell after reception module 95 receives MDT Log reporting request sent by target cell.

In practical application scenario, storage module 91 deletes MDT Log reported by sending module 94 after sending module 94 reports MDT Log to eNB.

Figure 10:
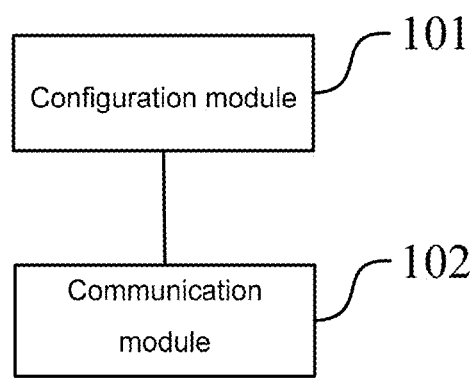
FIG. 10 is a structural diagram of eNB in the embodiment of the present invention.

Besides, the embodiments of the present invention provide an eNB, and the structural diagram is shown in FIG. 10, further including:

Configuration module 101, which is used to send to terminal equipment the message including whether feeding back MDT Log across any attribution zone is permitted;

Communication module 102, which is used to receive Log available message sent by terminal equipment, and send MDT Log reporting request after receiving Log available message.

Wherein, configuration module 101 sends the information whether feeding back MDT Log across any attribution zone is permitted through the following ways:

Configuration module 101 sends the configuration message carrying the information that terminal equipment is permitted to feed back MDT Log to any attribution zone(s) specified; or, Configuration module 101 sends the configuration message carrying the information that terminal equipment is permitted to feed back MDT Log to one or several attribution zones specified; wherein, the specified one or several attribution zones are specifically the predefined valid attribution zone(s).

Compared with the present technology, the present invention possesses the following advantages:

Upon application of technical solution proposed through embodiment of this invention, terminal equipment rationally choose whether to send Log available information to network in light of the fact whether present attribution zone of terminal equipment is a valid attribution zone. These can avoid feeding back MDT Log and further causing loss of valid MDT Log in case present attribution zone is not a valid attribution zone. Moreover, terminal equipment can decide whether to report Log available information according to actual attribution zone(s), which can avoid unnecessary reporting of MDT Log and validly save radio resource of the system.

Figure 11:
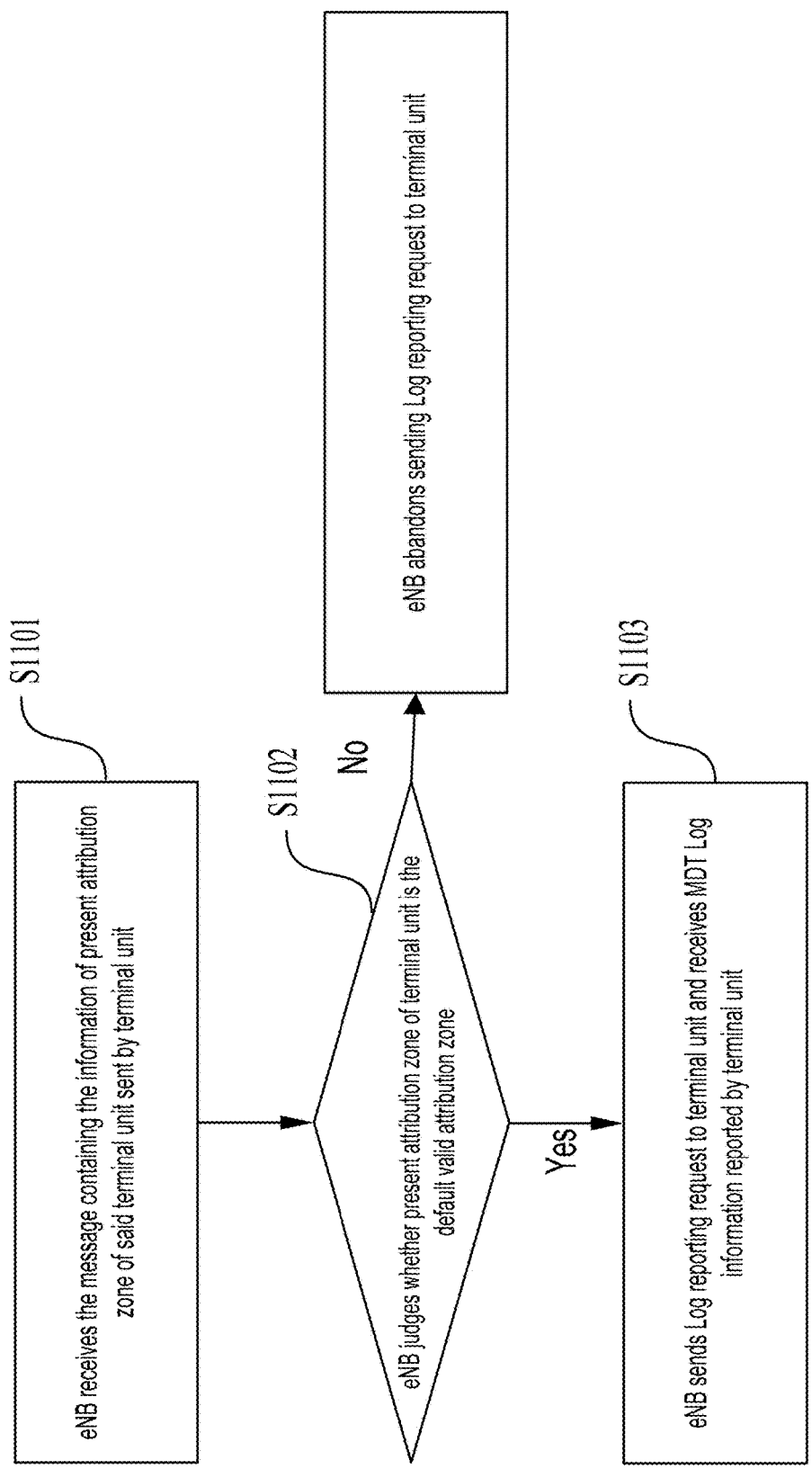
FIG. 11 is a flow diagram of method for feeding back MDT Log in the embodiment of the present invention.

Besides, the technical solution proposed in embodiments of the present invention can realize feedback of MDT Log by reporting the information of present attribution zone(s) to network side, which enable network side to judge whether to acquire MDT Log. As shown in FIG. 11, it is a flow diagram of method for feeding back MDT Log provided in the embodiments of the present invention; the method comprises the following steps:

Step S1101, eNB receives the message containing the information of present attribution zone(s) of said terminal equipment sent by terminal equipment, specifically as:

eNB receives the message containing the information of present attribution zone(s) of said terminal equipment sent by terminal equipment according to predefined cycle; or, eNB receives the message containing the information of present attribution zone(s) of said terminal equipment sent by terminal equipment on the premise of meeting predefined sending condition.

Herein, the predefined sending conditions are specifically:

Terminal equipment generates new MDT Log; and/or,

Present attribution zone(s) of terminal equipment changes.

Step S1102, eNB judges whether present attribution zone(s) of terminal equipment is the predefined valid attribution zone(s);

If "Yes", implement step S1103;

If "No", eNB abandons sending Log reporting request to terminal equipment.

In the practical application scenario, the predefined valid attribution zone(s) is specifically one or several kinds of the following information:

PLMN information, cell list information, eNB list information, SA zone(s) list information, tracking area list information and other information that can indicate attribution location zone(s) of terminal equipment.

Step S1103, eNB sends Log reporting request to terminal equipment and receives MDT Log reported by terminal equipment.

Figure 12:
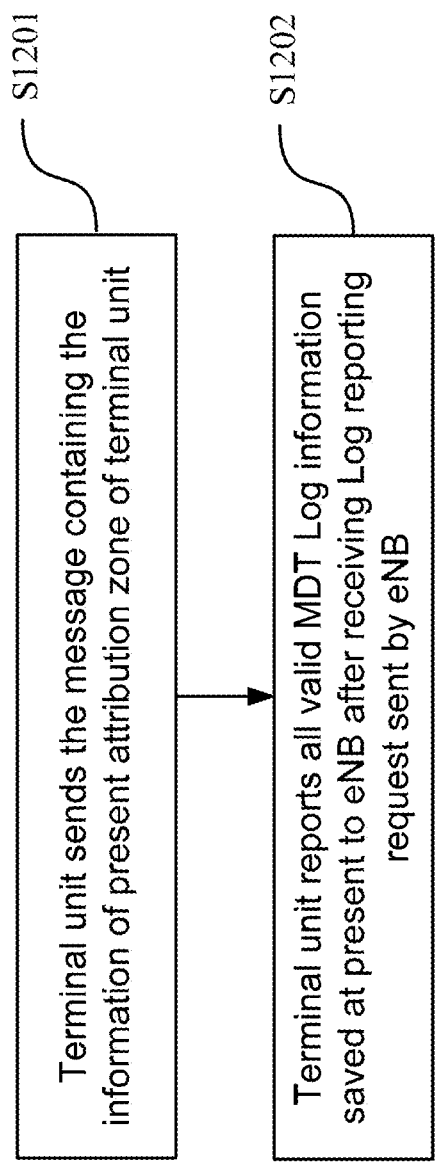
FIG. 12 is a flow diagram of method for feeding back MDT Log in the embodiment of the present invention.

Specifically, the processing solution aforesaid is the realization flow of eNB side. Embodiments of the present invention also provide the processing flow of terminal equipment side, as shown in FIG. 12, which comprises the following steps:

Step S1201, terminal equipment sends the message containing the information of present attribution zone(s) of said terminal equipment to eNB, specifically as:

Terminal equipment sends the message containing the information of present attribution zone(s) of said terminal equipment to eNB according to predefined cycle; or, Terminal equipment sends the message containing the information of present attribution zone(s) of said terminal equipment to eNB on the premise of meeting predefined sending condition.

Herein, the predefined sending conditions are specifically:

Terminal equipment generates new MDT Log; and/or,

Present attribution zone(s) of terminal equipment changes.

Step S1202, terminal equipment reports all valid MDT Log saved at present to eNB after receiving Log reporting request sent by eNB.

In the practical application scenario, it also comprises the following after said terminal equipment reports MDT Log to said eNB:

Said terminal equipment deletes said reported MDT Log.

Compared with the present technology, the present invention possesses the following advantages:

Upon application of technical solution proposed through embodiment of this invention, terminal equipment reports the information of present attribution zone(s) to network side, and then the information enables network side to judge whether to acquire MDT Log. These can avoid feeding back MDT Log and further causing loss of valid MDT Log in case present attribution zone(s) is not a valid attribution zone.

Detailed description of technical solution proposed through embodiment of this invention is given as below in combination with practical application scenario.

To simplify the description, the subsequent description takes the situation that network side does not permit terminal equipment to report across any attribution zone as the example. Situation permitting reporting across any attribution zone is given as above. No repeated description shall be provided, In the practical application scenario, terminal equipment reports the information of present attribution zone to network side to enable network side to judge whether to acquire MDT Log, specifically as:

Terminal equipment informs network side the attribution zone of the recording MDT Log or present attribution zone to enable network side to judge whether to acquire corresponding MDT Log.

Furthermore, terminal equipment can always report MDT Log attribution zone, or report the attribution zone of the recording MDT Log data to network under certain conditions (such as zone(s) switch, or generation of new MDT Log data). Moreover, format of zone(s) identification reported can be agreed in advance or configured by network; for example, cell list, eNB list, SA zone(s) list, tracking area list, etc.

Figure 13:
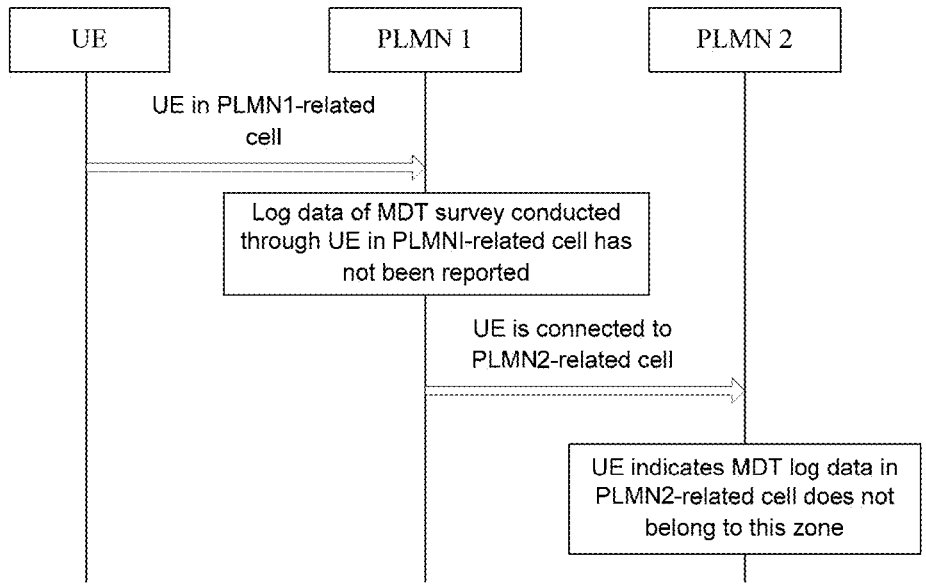
FIG. 13 is a flow diagram of method for feeding back MDT Log under concrete application scenario in the embodiment IV of the present invention.

Embodiment IV, terminal equipment informs network whether the MDT Log recorded itself belongs to present PLMN, as shown in FIG. 13.

Terminal equipment connects to PLMN1-related cell(s) and carries out Log MDT in PLMN1-related cell(s); it does not finish transmission of Log data of MDT in PLMN1-related cell(s). When moving from a PLMN1-related cell to PLMN2-related cell(s) through setup process/handover process/reestablishment process/cell update process, terminal equipment sends Log available information to PLMN2-related cell(s) and indicates the MDT Log data does not belong to PLMN2 zone(s).

eNB can decide whether to acquire MDT Log of terminal equipment based on its relevant survey; such as whether to support the transfer of MDT data in other zone(s) through interface of network node.

Figure 14:
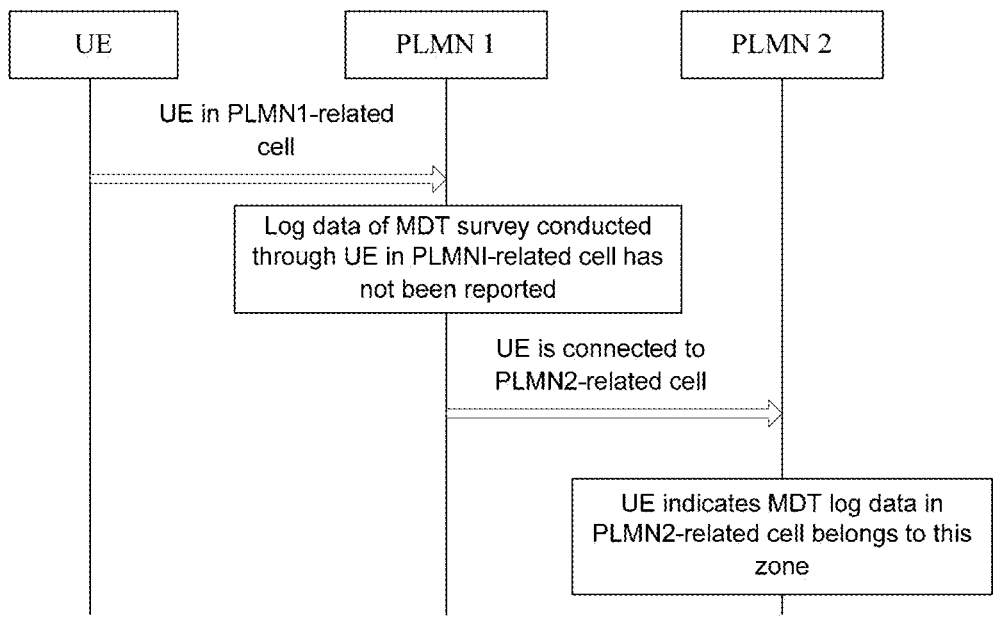
FIG. 14 is a flow diagram of method for feeding back MDT Log under concrete application scenario in the embodiment V of the present invention.

Embodiment V, terminal equipment informs network to which PLMN the MDT Log recorded itself belongs, as shown in FIG. 14.

Terminal equipment connects to PLMN1-related cell(s) and carries out Log MDT survey in PLMN1-related cell(s); it does not finish transmission of Log data of MDT survey in PLMN1-related cell(s). When moving from PLMN1-related cell(s) to PLMN2-related cell(s) through setup process/handover process/reestablishment process/cell update process, terminal equipment sends Log available message to PLMN2-related cell(s) and indicates the MDT Log data belongs to PLMN1 zone(s).

eNB can decide whether polling MDT Log data of terminal equipment based on its relevant survey; such as whether to support the transfer of MDT data in other zone(s) through interface of network node.

Specifically, said PLMN can also be eNB and the change does not affect the protection scope of the invention. It will not be repeated hereby.

It is necessary to be further pointed out that type of said message carrying attribution zone(s) information is not restricted and the specific message type will not influence the protection scope of the invention.

Compared with the present technology, the present invention possesses the following advantages:

Upon application of technical solution proposed through embodiment of this invention, terminal equipment reports information of present attribution zone(s) to the network and network side judges whether to acquire MDT Log. These can avoid feeding back MDT Log and further causing loss of valid MDT Log in case present attribution zone(s) is not a valid attribution zone. Moreover, terminal equipment can decide whether to report Log available message according to actual attribution zone(s), which avoids unnecessary reporting of MDT Log and validly saves radio resource of the system.

Figure 15:
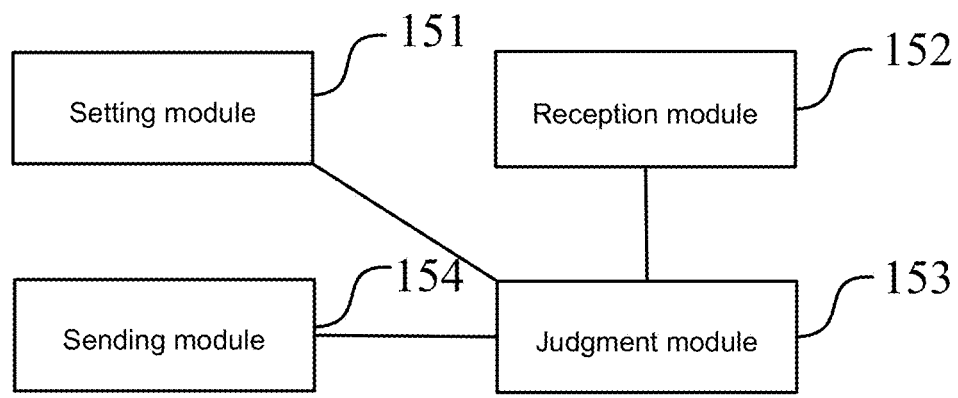
FIG. 15 is a structural diagram of eNB in the embodiment of the present invention.

To realize the technical solution proposed in said embodiments of the present invention, the embodiments of the present invention provide an eNB, and the structural diagram is shown in FIG. 15, including:

Setting module 151, which is used to set valid attribution zone(s);

Reception module 152, which is used to receive the message containing the information of present attribution zone(s) of said terminal equipment sent by terminal equipment, and MDT Log reported by said terminal equipment;

Judgment module 153, which is used to judge whether present attribution zone(s) of terminal equipment belongs to valid attribution zone(s) set by setting module 151 when reception module 152 receives the message containing the information of present attribution zone(s) of terminal equipment sent by terminal equipment;

Sending module 154, which is used to send Log reporting request to terminal equipment when judgment result of judgment module 153 is "Yes", which triggers terminal equipment to report MDT Log.

In practical application scenario, reception module 152 is specifically used to:

Receive the message containing the information of present attribution zone(s) of said terminal equipment sent by terminal equipment according to predefined cycle; or, Receive the message containing the information of present attribution zone(s) sent by terminal equipment on the premise of meeting predefined sending condition; wherein, predefined sending condition specifically refers to that terminal equipment generates new MDT Log, and/or present attribution zone(s) of terminal equipment changes.

Wherein, valid attribution zone(s) set by setting module 151 is specifically one or several kinds of the following information:

PLMN information, cell list information, eNB list information, SA zone(s) list information, tracking area list information, and other information that can indicate attribution location zone(s) of terminal equipment.

Figure 16:
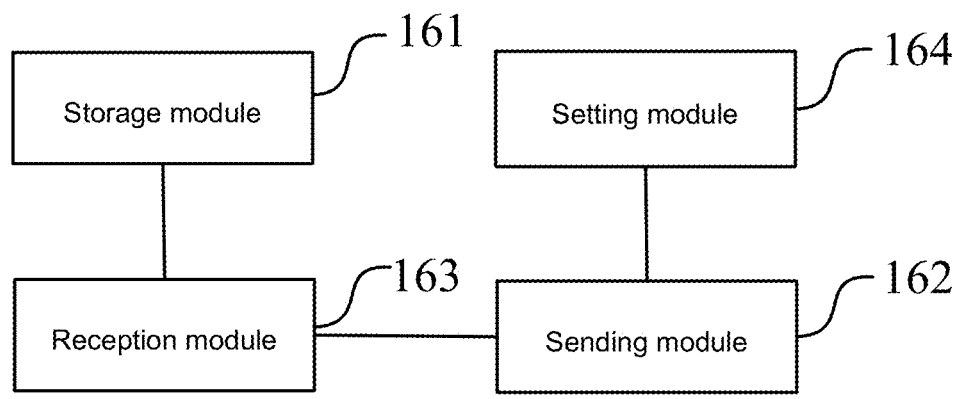
FIG. 16 is a structural diagram of terminal equipment in the embodiment of the present invention.

Besides, the embodiments of the present invention provide a terminal equipment, and the structural diagram is shown in FIG. 16, including:

Storage module 161, which is used to save MDT Log;

Sending module 162, which is used to send the message containing the information of present attribution zone(s) of terminal equipment to eNB;

Reception module 163, which is used to receive Log reporting request sent by eNB and trigger sending module 162 to report all valid MDT Log saved by storage module 161 currently to eNB.

Furthermore, said terminal equipment also comprises setting module 164 which is used to set reporting cycle or sending condition of the information of present attribution zone(s);

Sending module 162, which is specifically used to send the message containing the information of present attribution zone(s) of said terminal equipment to eNB according to the reporting cycle set by setting module 164; or, Sending module 162, which is specifically used to send the message containing the information of present attribution zone(s) of said terminal equipment to eNB when sending conditions set by setting module 164 are met; wherein, sending condition specifically refers to that terminal equipment generates new MDT Log, and/or present attribution zone(s) of terminal equipment changes.

Furthermore, it also comprises the following after sending module 162 has reports all valid MDT Log saved by storage module 161 at present to eNB:

Storage module 161 deletes MDT Log reported by sending module 162.

Compared with the present technology, the present invention possesses the following advantages:

Upon application of technical solution proposed through embodiment of this invention, terminal equipment reports information of present attribution zone(s) to the network and network side judges whether to acquire MDT Log. These can avoid feeding back MDT Log and further causing loss of valid MDT Log in case present attribution zone(s) is not a valid attribution zone. Moreover, terminal equipment can decide whether to report Log available message according to the condition of actual attribution zone(s), which avoids unnecessary reporting of MDT Log and validly saves idle resource of the system.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to present technology can be essentially reflected by means of software product. This computer software product is saved in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not necessary for the implementation of the embodiments of the present invention.

Technical personnel of the field can understand that the module of the unit of an embodiment can be distributed in such unit according to embodiment description, or located in one or more units of another embodiment through corresponding changes. Modules of the embodiments mentioned above can be merged into one module, or further divided into multi-submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

What is claimed is:

1. A method for feeding back minimization drive test (MDT) logs, the method comprising:

determining whether a terminal equipment connects to a target cell by switching from an idle state to a connection state, or reestablishes to a target cell in a connection state, or alters from a current attribution cell to a target cell during a connection state, and upon positive determination thereof, said terminal equipment verifying whether feeding back MDT logs across arbitrary attribution zones is permitted;

if said terminal equipment verifies that feeding back the MDT log across arbitrary attribution zones is not permitted, said terminal equipment judging whether an attribution zone corresponding to evolved Node B(s) (eNB(s)) of said target cell is a predefined valid attribution zone; and if a judgment result is "Yes", said terminal equipment sending log available message to eNB(s) of said target cell.

2. The method as claimed in claim 1, wherein said terminal equipment verifying whether feeding back MDT logs across arbitrary attribution zones is permitted comprises:

determining whether said terminal equipment is set to permit to feed back MDT logs to eNB(s) in one or several specified attribution zones, or said terminal equipment receives a message carrying configuration information that permits said terminal equipment to feed back MDT logs eNB(s) in one or several specified attribution zones, and upon positive determination thereof, said terminal equipment verifying that feeding back MDT logs across arbitrary attribution zones is not permitted, but only feeding back MDT logs to eNB(s) in the one or several specified attribution zones is permitted; and determining whether said terminal equipment receives a message carrying configuration information that permits said terminal equipment to feed back MDT logs to eNBs in arbitrary attribution zones, or said terminal equipment is set to permit to feed back MDT logs to eNBs in arbitrary attribution zones, and upon positive determination thereof, said terminal equipment verifying that feeding back MDT logs across arbitrary attribution zones is permitted;

wherein, said one or several specified attribution zones are predefined valid attribution zones.

3. The method as claimed in claim 2, wherein when said terminal equipment receives MDT configuration when it is belonging to a public land mobile-communication network (PLMN), then said PLMN is verified as a valid attribution zone, and said terminal equipment is set to permit to feed back MDT logs to eNB(s) in the PLMN;

when said terminal equipment is configured as that one or several PLMNs are valid attribution zones, said terminal equipment is set to permit to feed back MDT logs to eNBs in said one or several PLMNs, and when said terminal equipment is configured as that the corresponding zones of one or several eNBs are valid attribution zones, said terminal equipment is set to permit to feed back MDT logs to said one or several said eNBs.

4. The method as claimed in claim 2, wherein the predefined valid attribution zones are specifically one or several kinds of the following information:

PLMN information, cell list information, eNB list information, SA zones list information, tracking area list information, and other-information that can indicate location zones where the terminal equipment attributes.

5. The method as claimed in claim 2, wherein when said terminal equipment verifies that feeding back MDT logs to arbitrary attribution zones is permitted, said method further comprises:

said terminal equipment judging whether the MDT logs are saved in the terminal equipment at present;

if "Yes", said terminal equipment judging whether said MDT logs are valid; and if all or parts of MDT logs are valid, said terminal equipment sending log available message to eNB(s) of said target cell.

6. The method as claimed in claim 2, wherein when said terminal equipment verifies that feeding back MDT logs to eNB(s) in the one or several specified attribution zones is permitted, said method further comprises:

said terminal equipment judging whether the MDT logs are saved in the terminal equipment at present;

if "Yes", said terminal equipment judging whether said MDT logs are valid;

if all or parts of said MDT logs are valid, said terminal equipment judging whether attribution zone(s) corresponding to said target cell belongs to said one or several specified attribution zones;

if "Yes", said terminal equipment sending log available message to eNB(s) of said target cell; and if "No", said terminal equipment abandoning sending log available message to eNB(s) of said target cell and continuing keeping said MDT log.

7. The method as claimed in claim 5, wherein after said terminal equipment sends-sending the log available message to eNB(s) of said target cell, the method further comprises:

said terminal equipment reporting all valid MDT logs saved at present to eNB(s) of said target cell after receiving a log reporting request sent by said target cell.

8. The method as claimed in claim 7, wherein after said terminal equipment reporting MDT logs to said eNB, the method further comprises:

said terminal equipment deleting MDT Logs that have reported.

9. The method as claimed in claim 1, wherein if a judgment result is "No", the method further comprises:

said terminal equipment abandoning sending log available message to eNB(s) of said target cell, and continuing keeping said MDT Logs.

10. A terminal equipment comprising:

a storage module, which is used to save minimization drive test (MDT) logs;

a verification module, which is used to verify whether feeding back MDT logs across arbitrary attribution zone is permitted when said terminal equipment connects to a target cell by switching from an idle state to a connection state, or reestablishes to a target cell in a connection state, or alters from a current attribution cell to a target cell during a connection state;

a judgment module, which is used to judge whether an attribution zone corresponding to evolved Node B(s) (eNB)(s) of said target cell is a predefined valid attribution zone when said verification module verifies that feeding back MDT Logs across arbitrary attribution zone is not permitted;

a sending module, which is used to send log available message to eNB(s) of said target cell when the judgment result of said judgment module is "Yes".

11. The terminal equipment as claimed in claim 10, wherein through said verification module verifies whether feeding back MDT Logs L-g across arbitrary attribution zones is permitted in following manners:

determining whether said verification module verifies that said terminal equipment is set to permit to feed back MDT logs to eNB(s) in one or several specified attribution zones, or verifies that a message carrying configuration information that permits said terminal equipment to feed back MDT logs to eNB(s) in one or several specified attribution zones is received, and upon positive determination thereof, said verification module verifies that feeding back MDT logs across arbitrary attribution zones is not permitted, but only feeding back MDT logs to corresponding eNB(s) in one or several attribution zones is permitted;

determining whether said verification module verifies that a message carrying configuration information that permits said terminal equipment to feed back MDT logs to eNBs in arbitrary attribution zones is received, or verifies that said terminal equipment is set to permit to feed back MDT logs to eNBs in arbitrary attribution zones, and upon positive determination thereof, said verification module verifies that feeding back MDT logs across arbitrary attribution zones is permitted; and wherein, said one or several specified attribution zones are predefined valid attribution zones.

12. The terminal equipment as claimed in claim 11, wherein the predefined valid attribution zones are specifically one or several kinds of the following information:

public land mobile-communication network (PLMN) information, cell list information, eNB list information, SA zones list information, tracking area list information and other information that can indicate location zones where the terminal equipment attributes.

13. The terminal equipment as claimed in claim 11, wherein when said verification module verifies that feeding back MDT logs to arbitrary attribution zone is permitted, said judgment module judges whether currently said storage module saves valid MDT logs, and if "Yes", said sending module sends log available message to eNB(s) of said target cell;

when said verification module verifies that feeding back MDT logs to eNB(s) in the one or several specified attribution zones is permitted, said judgment module judges whether currently said storage module saves valid MDT logs; and if "Yes", said judgment module judges whether attribution zone(s) corresponding to said target cell belongs to said one or several specified attribution zones; if it is judged as "Yes", said sending module sends log available message to eNB(s) of said target cell; and if judged as "No", said sending module abandons sending log available message to eNB(s) of said target cell and said storage module continues keeping said MDT logs.

14. The terminal equipment as claimed in claim 13, further comprising a reception module, which is used to receive an MDT log reporting request sent by said target cell after said sending module sends the log available message to eNB(s) of said target cell; and said sending module is further used to reports all valid MDT logs saved currently to eNB(s) of said target cell after said reception module receives the MDT log reporting request sent by said target cell.

15. The terminal equipment as claimed in claim 10, wherein said storage module deletes MDT logs that have reported by said sending module after said sending module reporting MDT logs to said target cell.

16. An evolved Node B (eNB) comprising:
   a configuration module, which is used to send, to a terminal equipment, a message whether feeding back minimization drive test (MDT) logs across arbitrary attribution zones is permitted;
   a communication module, which is used to receive a log available message sent by said terminal equipment, and send an MDT log reporting request to said terminal equipment after receiving the log available message.

17. The eNB as claimed in claim 16, wherein said configuration module sends the message whether feeding back MDT logs across arbitrary attribution zone is permitted in following manners:
   said configuration module sends a message carrying configuration information that permits the terminal equipment to feed back MDT logs to eNB(s) in arbitrary attribution zones; or,
   said configuration module sends a message carrying configuration information that permits the terminal equipment to feed back MDT logs to eNB(s) in one or several specified attribution zones;
   wherein the one or several specified attribution zones are predefined valid attribution zones.

* * * * *